United States Patent
Jung et al.

(10) Patent No.: US 9,094,877 B2
(45) Date of Patent: *Jul. 28, 2015

(54) HANDOVER METHOD IN WIRELESS COMMUNICATION SYSTEM

(75) Inventors: Soojung Jung, Daejeon (KR); Juhee Kim, Daejeon (KR); Eunkyung Kim, Daejeon (KR); Jae Sun Cha, Daejeon (KR); Kwang Jae Lim, Daejeon (KR); Hyun Lee, Daejeon (KR); Chul Sik Yoon, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 138 days.

This patent is subject to a terminal disclaimer.

(21) Appl. No.: 13/383,209

(22) PCT Filed: Jul. 9, 2010

(86) PCT No.: PCT/KR2010/004498

§ 371 (c)(1),
(2), (4) Date: Jan. 9, 2012

(87) PCT Pub. No.: WO2011/005061

PCT Pub. Date: Jan. 13, 2011

(65) Prior Publication Data

US 2012/0113943 A1 May 10, 2012

(30) Foreign Application Priority Data

Jul. 10, 2009 (KR) .......... 10-2009-0063011
Jul. 9, 2010 (KR) .......... 10-2010-0066631

(51) Int. Cl.
*H04W 36/00* (2009.01)
*H04W 36/28* (2009.01)

(52) U.S. Cl.
CPC ...... *H04W 36/0016* (2013.01); *H04W 36/0072* (2013.01); *H04W 36/28* (2013.01)

(58) Field of Classification Search
CPC .............. H04W 36/0016; H04W 36/0072; H04W 36/28
USPC .................................. 370/329–331
See application file for complete search history.

(56) References Cited

U.S. PATENT DOCUMENTS 8,498,249 B2 7/2013 Fu
2009/0310563 A1 12/2009 Chou et al.

(Continued)

FOREIGN PATENT DOCUMENTS

JP 2011524133 A 8/2011
JP 2011238999 A 11/2011

(Continued)

OTHER PUBLICATIONS

Inuk Jung et al.; "Comments and Text Proposal on HO MAC message for Intra-16m Handover AWD document"; IEEE 802.16 Broadband Wireless Access Working Group <http://ieee802.org/16>; Jul. 7, 2009.

(Continued)

*Primary Examiner* — Un C Cho
*Assistant Examiner* — Fangyan Deng
(74) *Attorney, Agent, or Firm* — Rabin & Berdo, P.C.

(57) ABSTRACT

Disclosed is a method of a handover in a wireless communication system. The method includes transmitting a handover request message to the service BS, and receiving a handover command message from the service BS in response to the handover request message. Multi-carriers are assigned to a terminal in advance right before a handover, and all or some of the multi-carriers are activated right after the handover. Therefore, multi-carrier are effectively utilized.

8 Claims, 3 Drawing Sheets

(56) References Cited

U.S. PATENT DOCUMENTS

| | | | |
|---|---|---|---|
| 2010/0272067 A1* | 10/2010 | Lu et al. | 370/331 |
| 2010/0284367 A1* | 11/2010 | Koo et al. | 370/331 |
| 2010/0303039 A1 | 12/2010 | Zhang et al. | |
| 2011/0249566 A1* | 10/2011 | Bergman et al. | 370/241 |
| 2012/0046066 A1 | 2/2012 | Tamura et al. | |
| 2013/0294370 A1 | 11/2013 | Fu | |

FOREIGN PATENT DOCUMENTS

| | | |
|---|---|---|
| JP | 2012520626 A | 9/2012 |
| JP | 2012525027 A | 10/2012 |
| KR | 2005-0107254 A | 11/2005 |
| KR | 2007-0009707 A | 1/2007 |
| KR | 2007-0081013 A | 8/2007 |
| KR | 2007-0103490 A | 10/2007 |
| WO | WO-2010113490 A1 | 10/2010 |

OTHER PUBLICATIONS

Kelvin Chou et al.; "ASN.1 Encoding for Handover Messages (16.2.3)"; IEEE 802.16 Broadband Wireless Access Working Group <http://ieee802.org/16>; Mar. 5, 2010.

Inuk Jung et al.; "Multi-Carrier Supported Handover Procedures"; IEEE 802.16 Broadband Wireless Access Working Group <http://ieee802.org/16>; Sep. 5, 2008.

"Inter-eNB HO behavior in carrier aggregation"; 3GPP TSG RAN WG2#69; Panasonic; May 10-14, 2010; Montreal, Canada.

* cited by examiner

HANDOVER METHOD IN WIRELESS COMMUNICATION SYSTEM

TECHNICAL FIELD

The present invention relates to wireless communications, and more particularly, to a handover method in a wireless communication system.

BACKGROUND ART

A wireless communication system is a cellular system. The cellular system means a system which provides a communication service by dividing a service zone into a plurality of cells. Through the cellular system, it is possible to overcome restriction on the service zone and a limit on capacity for users. The cell is a specific geographical zone where one base station BS provides communication service. A terminal belongs to one cell and connects with the BS of the cell, thereby communicating with the base station.

In the wireless communication system, a mobile terminal has to continuously communicate with the BS. In the case that the terminal moves from one cell to another cell, the terminal has to disconnect from the existing BS and newly connect with a BS that belongs to a new cell. Thus, a procedure of changing the BS due to the movement of the terminal is called a handover. Here, the BS to which the terminal is currently connected will be called a service BS, and the BS with which the terminal tries to newly connect will be called a target BS.

The wireless communication system may be a single-carrier system that supports one carrier. In the single-carrier system, one carrier is used for data exchange between the BS and the terminal. Since a transmission rate is proportional to a transmission bandwidth, the transmission bandwidth has to be increased to support a high transmission rate. However, frequency assignment for a large bandwidth is not easy except some areas from all over the world. To efficiently use a split small band, spectrum aggregation has been developed. The spectrum aggregation is also called bandwidth aggregation or carrier aggregation. The spectrum aggregation groups a plurality of physically contiguous or non-contiguous bands in a frequency domain and thus has the same effect of logically using a large band. Through the spectrum aggregation, multi-carriers can be supported in the wireless communication system. The wireless communication system capable of supporting the multi-carriers is called a multi-carrier system. In the multi-carrier system, one or more carriers are employed for the data exchange between the BS and the terminal.

However, the multi-carrier system is different in the handover from the single-carrier system. Accordingly, an efficient method for the handover is needed in the wireless communication system that supports the multi-carriers.

DISCLOSURE

Technical Problem

The present invention provides a handover method in a wireless communication system.

Technical Solution

In an aspect of the present invention, a method of a handover from a service base station (BS) to a target BS by a terminal in a wireless communication system is provided. The method includes transmitting a handover request message to the service BS, and receiving a handover command message from the service BS in response to the handover request message.

The handover request message includes a pre-assignment requirement indicator for indicating whether the terminal requires pre-assignment of a first carrier among multi-carriers at the target BS during a handover.

A method of controlling a handover of a terminal by a service base station (BS) in a wireless communication system, the method comprising In another aspect of the present invention, a method of controlling a handover of a terminal by a service base station (BS) in a wireless communication system is provided. The method includes receiving a handover request message from the terminal, transmitting a handover command message to the terminal in response to the handover request message.

The handover request message includes a pre-assignment requirement indicator for indicating whether the terminal requires pre-assignment of a first carrier at a target BS during a handover. The handover command message includes a pre-assignment response indicator for indicating whether the first carrier among multi-carriers at the target BS is pre-assigned to the terminal.

Advantageous Effects

There is provided an efficient handover method in a wireless communication system. Accordingly, total system performance can be improved.

MODE FOR INVENTION

Figure 1:
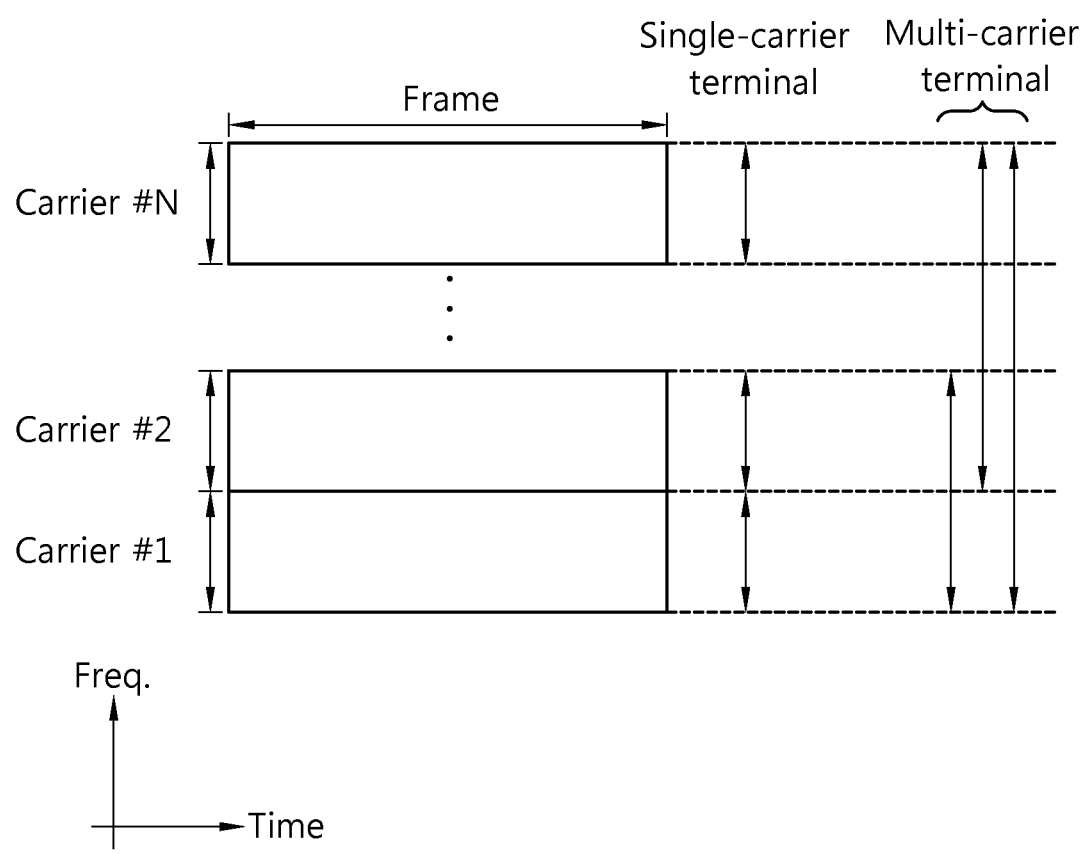
FIG. 1 shows an example of a frame structure supporting multi-carriers.

Exemplary embodiments of the present invention will be described in detail with reference to accompanying drawings so as to be easily realized by a person having ordinary knowledge in the art. However, the present invention may be embodied in various forms without being limited to the exemplary embodiments set forth herein. In the drawings, unrelated parts are omitted for clearly explaining the present invention, and like reference numerals refer to like elements throughout. Further, descriptions of a part that can be easily appreciated by those skilled in the art are omitted.

Throughout the specification and claims, if a certain part includes a certain element, it means not that the certain part excludes other elements but that the certain part can additionally include other elements as long as there is no negative mention.

In this specification, a terminal may refer to a mobile station (MS), a mobile terminal (MT), a subscriber station (SS), a portable subscriber station (PSS), user equipment (UE), an access terminal (AT), etc. and may have all or partial functions of the MS, the MT, the SS, the PSS, the UE, the AT, etc.

In this specification, a base station (BS) may refer to an access point (AP), a radio access station (RAS), a node B, an evolved node B (eNB), a base transceiver station (BTS), a mobile multi-hop relay-BS (MMR-BS), etc., and may have all or partial functions of the AP, the RAS, the node B, the eNB, the BTS, the MMR-BS, etc.

The BS supporting multi-carriers may refer to an advanced BS (ABS), and the terminal supporting the multi-carriers may refer to an advanced mobile station (AMS). For example, the BS and the terminal to be described hereinafter may be the ABS and the AMS, respectively.

FIG. 1 shows an example of a frame structure supporting multi-carriers.

Referring to FIG. 1, a frame in a time domain indicates fixed duration for data transmission. The BS supports N carriers (carrier #1, carrier #2, . . . , carrier #N, where N is a natural number equal to and greater than 2). A single-carrier terminal is assigned with only one carrier from the BS. A multi-carrier terminal is assigned with a plurality of carriers from the BS.

n of the carrier #n (n=1, 2, . . . , N) may be regarded as a physical carrier index for identifying the plurality of carriers supported by the BS. For example, if the BS assigns a carrier having a physical carrier index of 2 to a first terminal, the first terminal can transmit and receive data with the BS through the carrier #2. If the BS assigns the carriers having physical carrier indexes of 1, 3 and 5 to a second terminal, the second terminal can transmit and receive data with the BS through the carrier #1, the carrier #3 and the carrier #5.

The terminal assigned with the plurality of carriers may use only some carriers among the plurality of assigned carriers to transmit and receive data. Below, the carrier being practically used in transmitting and receiving the data will be referred to as an active carrier. There may be one or plural active carriers.

The terminal regards only one carrier among the plurality of assigned carriers as a primary carrier. The primary carrier is employed when the terminal exchanges traffic data and control information with the BS. If there is one active carrier, the active carrier is the primary carrier. On the other hand, if there is a plurality of active carriers, one carrier among the plural active carriers is the primary carrier.

A logical carrier index may be given to the active carrier between the BS and the terminal. For example, assuming that the terminal is assigned with the carriers having the physical carrier indexes of 1, 3 and 5 from the BS, only the carrier #1 and the carrier #3 may be the active carriers. In this case, a logical carrier index of 1 may be set to the carrier #1, and a logical carrier index of 2 may be set to the carrier #3.

Thus, the plurality of carriers may be distinguished by the physical carrier index from one another before being used in transmission/reception between the BS and the terminal. Further, the logical carrier index may be given to the active carrier currently being used in transmitting and receiving data. That is, the physical carrier index is used to distinguish the carriers for one BS, and the logical carrier index is used to distinguish the carriers for one terminal.

Below, the carrier index indicates either the physical carrier index or the logical carrier index.

Figure 2:
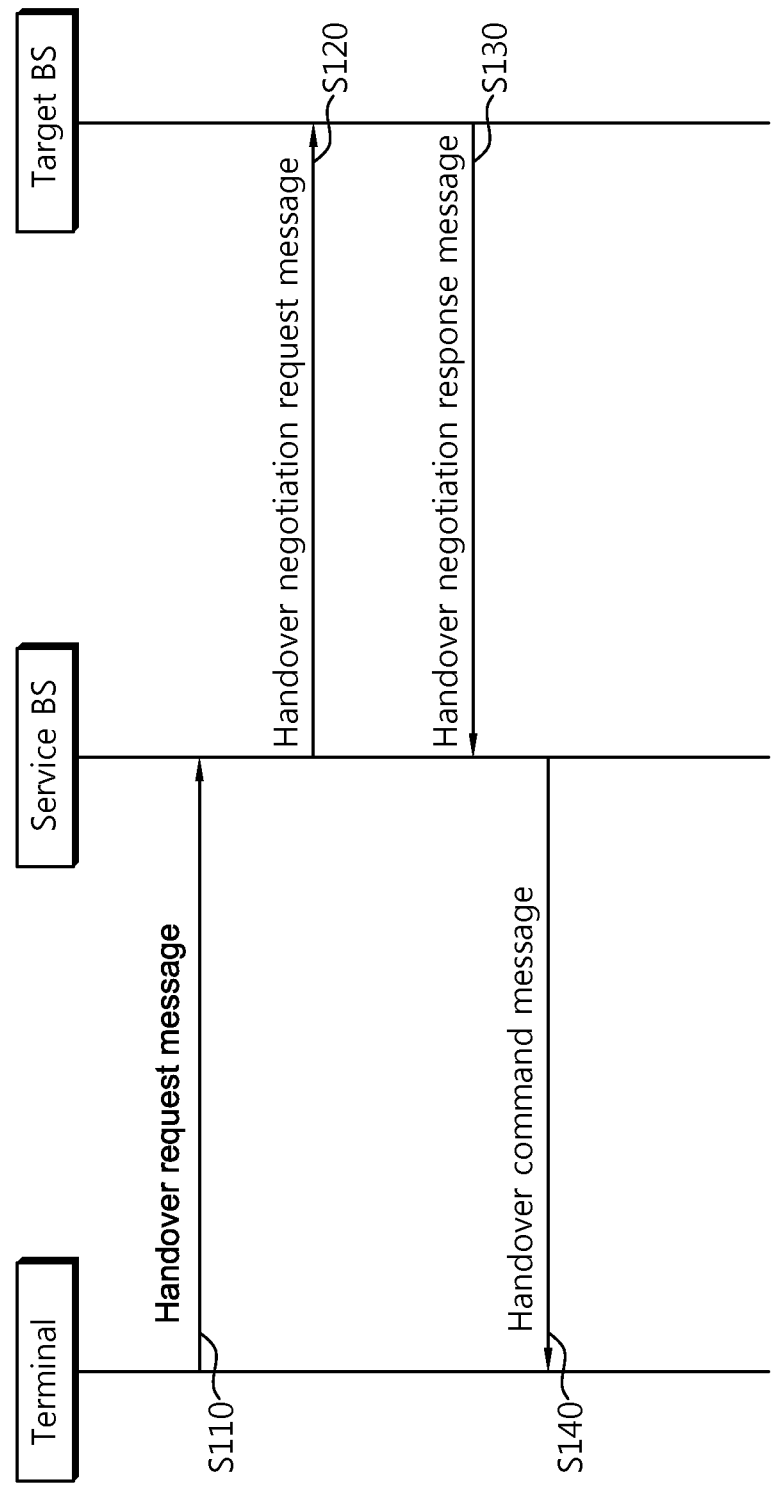
FIG. 2 is a flowchart showing an example of a handover method.

FIG. 2 is a flowchart showing an example of a handover method.

Referring to FIG. 2, the terminal transmits a handover request message to the service BS (S110). In a handover initiated by the terminal, the terminal transmits the handover request message to the service BS in order to initiate the handover. For example, the handover request message is an advanced air interface_handover-request (AAI_HO_REQ).

After receiving the handover request message, the service BS transmits and receives handover negotiation messages to and from the target BS, thereby performing a handover negotiation. As an example of the handover request messages, there are a handover negotiation request message, a handover negotiation response message, etc. The handover negotiation messages may be transmitted between the service BS and the target BS through a backhaul network or a backbone network.

The service BS transmits the handover negotiation request message to the target BS (S120). The target BS transmits the handover negotiation response message to the service BS (S130). For example, the handover negotiation request message is a handover-request (HO-REQ), and the handover negotiation response message is a handover-response (HO-RSP).

After the negotiation between the service BS and the target BS, the service BS transmits a handover command message to the terminal (S140). The handover command message is transmitted in response to the handover request message. For example, the handover command message is an advanced air interface_handover-command (AAI_HO-CMD).

Hereinafter, the handover request message and the handover command message will be described in detail.

I. Handover Request Message

The handover request message includes a pre-assignment requirement indicator.

According to the set value, the pre-assignment requirement indicator indicates whether the terminal requires the assignment of carriers in advance to be used in the target BS. Here, the pre-assigned multi-carriers may be secondary carriers. For convenience of description, it will be assumed that the terminal requires the assignment of the secondary carriers in advance in the target BS if the pre-assignment requirement indicator is set to '1'. On the other hand, it will be assumed that the terminal does not require the assignment of secondary carriers in advance in the target BS if the pre-assignment requirement indicator is set to '0'.

Detailed examples of the pre-assignment requirement indicator are as follows.

1. Primary Carrier as the Only Active Carrier for the Terminal (1) If the terminal is using one carrier among the plurality of assigned carriers as the active carrier, the terminal may require pre-assignment of carriers in advance at a handover. At this time, the terminal transmits the handover request message with a pre-assignment requirement indicator set to '1'. In this case, if the BS commands the terminal to perform handover procedure while maintaining service of the service BS (e.g., HO Reentry Mode=1), the terminal can perform the handover as continuously receiving the service through the primary carrier being currently active at the service BS.

(2) If the terminal requires to employ only the primary carrier being currently active at the handover, the terminal transmits the handover request message with a pre-assignment requirement indicator set to '0'.

2. A Plurality of Active Carriers for the Terminal (1) If the terminal is using the plurality of carriers as the active carriers, the terminal may employ only one carrier and does not require to be assigned with the carriers of the target BS in advance at the handover. At this time, the terminal transmits the handover request message with a pre-assignment requirement indicator set to '0'.

(2) If the terminal requires the pre-assignment of active carriers in advance at the handover, the terminal transmits the handover request message with a pre-assignment requirement indicator set to '1'.

After receiving the handover request message, the service BS ascertains the pre-assignment requirement indicator. When the pre-assignment requirement indicator is set to '1', the service BS ascertains whether the target BS is capable of assigning at least one carrier among the multi-carriers in advance, under negotiation with the target BS. To this end, the handover negotiation messages may include a field corresponding to the pre-assignment requirement indicator.

Thus, the wireless communication system supporting the multi-carriers can make the handover-related messages include a field about whether to be assigned with the multi-carriers in advance. Accordingly, information about whether at least one carrier among the multi-carriers are assigned in advance at the handover may be used for the negotiation in a preparatory course of the handover between the service BS and the target BS.

II. Handover Command Message

The handover command message contains a pre-assignment response indicator. The pre-assignment response indicator indicates whether at least one carrier is assigned in advance at the handover of the terminal. For example, if the pre-assignment response indicator is '1', it indicates that at least one of the multi-carriers is assigned in advance at the target BS. On the other hand, if the pre-assignment response indicator is '0', it indicates that at least one of the multi-carriers is not assigned in advance at the target BS. Here, the pre-assigned multi-carriers may be secondary carriers. Also, the handover command message may further contain information about the number of pre-assigned carrier(s). For example, if the number of pre-assigned carrier(s) is it may indicate that any secondary carrier is not assigned in advance.

If the pre-assignment response indicator is '1' (i.e., if at least one of the multi-carriers is assigned in advance), detailed information about which carrier will be assigned in advance is indicated by pre-assigned carrier information contained in the handover command message. The pre-assigned carrier information is information about at least one of the multi-carriers assigned in advance for the terminal depending on the negotiation between the service BS and the target BS, and may be either the physical carrier index of the carrier or the logical carrier index implicitly assigned in order of respective pre-assigned carriers. The pre-assigned carrier information is transmitted to the service BS through the backbone network, and transmitted to the terminal as being included in the handover message.

A detailed information field of the pre-assigned carrier information may include a center frequency, a bandwidth, a duplex mode, a carrier type, a preamble index, a transmission power, etc. The duplex mode may be divided into a time division duplex (TDD), a frequency division duplex (FDD), and a half-duplex FDD (H-FDD).

If the pre-assignment response indicator is set to '0', the handover command message does not contain the pre-assigned carrier information.

The handover command message may further include carrier activation information which informs about whether to activate or inactivate a carrier among the pre-assigned multi-carriers immediately after the handover.

According to an exemplary embodiment, the carrier activation information may be a bitmap for designating a carrier to be activated and a carrier to be inactivated among the pre-assigned carriers immediately after the handover. For instance, assume that there are three pre-assigned multi-carriers of C1, C2 and C3. Further, assume that the carrier corresponding to a bit of '1' is activated and the carrier corresponding to a bit of '0' is inactivated. If the carrier activation information is '110', it shows that C1 and C2 are activated but C3 is inactivated.

According to another exemplary embodiment, the carrier activation information may indicate the number of carriers to be activated among the pre-assigned carriers. In this case, order of arranging the physical carrier indexes of the pre-assigned carriers may be determined depending on the number of pre-assigned carriers and the number of activated carriers. For example, if the number of pre-assigned carriers is 3 and the number of activated carriers is 2, total three physical carrier indexes are included. In accordance with the arranged order, the carriers indicated by the first two physical carrier indexes may be the active carriers as well as the assigned carriers. Further, the carrier indicated by the last physical carrier index may be an inactivated carrier among the assigned carriers. Thus, the physical carrier indexes of the active carrier may be arranged first among the physical carrier indexes of the respective assigned carriers.

The logical carrier indexes may be given to the carriers to be activated. The logical carrier indexes may be automatically given in order of providing the physical carrier indexes indicating the assigned carriers. That is, the physical carrier indexes indicating the active carriers among the assigned carriers may be first provided in order.

Immediately after a network reentry of the terminal, the carriers indicated by the carrier activation information are activated among the pre-assigned carriers. The terminal activates the carriers indicated by the carrier activation information after receiving a ranging response message from the target BS. If the terminal transmits a CM-IND message after the network reentry, the target BS may initiate data transmission to the activated pre-assigned carriers. If the target BS does not receive the CM-IND message from the terminal within an activation deadline directed in the ranging response message, the target BS determines that the pre-assigned carrier fails in the activation. In this case, the target BS transmits a CM-CMD message so that the terminal can activate another pre-assigned carrier. Before assigning the carrier in advance, the service BS may transmit information about a multi-carrier capability of the terminal to the target BS through the backbone network. If the terminal, which receives the handover command message containing carrier assignment information, recognizes that the multi-carrier set of the target BS is different from that of the service BS on the basis of a neighbor advertisement message, the terminal can newly negotiate the multi-carrier capability with the target BS on the basis of the multi-carrier request/multi-carrier response messages.

The handover command message may further include a reentry mode field. The reentry mode field is a field indicating whether to communicate with the service BS while performing the network reentry into the target BS. According to setting values, the reentry mode field may indicate whether the terminal keeps communication with the service BS while performing the network reentry into the target BS. For example, if the reentry mode field is '1', the terminal keeps the communication with the service BS while performing the network reentry into the target BS. On the other hand, if the reentry mode field is '0', the terminal disconnects from the service BS before performing the network reentry into the target BS.

The terminal may receive the handover command message containing the reentry mode field that indicates whether to keep the communication with the service BS while performing the network reentry into the target BS. In this case, the terminal employs some carriers among the plurality of carriers to keep the communication with the service BS, and at the same time employs the other carriers to perform the handover.

The handover command message may further include an identifier (ID) of the target BS. There may be a plurality of target BSs. If there is the plurality of target BSs, the handover command message may contain the ID and the pre-assigned carrier information of each of the plural target BSs.

The carriers may be classified into a fully configured carrier and a partially configured carrier. The fully configured carrier is a carrier where all control channels including synchronization, broadcast, multicast and unicast control signaling are configured. The partially configured carrier is a carrier where only downlink transmission is configured in the TDD, or a downlink carrier where there is no paired uplink carrier in the FDD.

The preamble index is a parameter that defines a preamble. The preamble is used in initial synchronization between the BS and the terminal, cell search, frequency offset, channel estimation, etc.

At the time when the pre-assigned carrier information is provided, the detailed information field may be included in the handover command message. A reference carrier indicator may be used in the detailed information field. If one assigned carrier among the plurality of assigned carriers has the same detailed information as a reference carrier, the detailed information field may indicate the reference carrier on the basis of the reference carrier indicator. For example, if a first carrier among the plurality of assigned carriers has the same detailed information as the reference carrier, the detailed information field indicates the detailed information of the reference carrier instead of the detailed information of the first carrier. That is, the detailed information of the reference carrier may be used as that of the first carrier.

The reference carrier may be set as either a carrier of the service BS or a carrier of another target BS. The reference carrier indicator may include a BS indicator and a carrier index. For example, suppose that the handover command message includes a detailed information field about each of the plural carriers of a first target BS, and a detailed information field about each of the plural carriers of a second target BS. The detailed information field about each of the plural carriers of the second target BS may use the reference carrier indicator. The reference carrier indicator may be configured with a BS indicator for indicating whether it is the service BS or the second target BS and a carrier index. For example, if a BS indicator is '1', it indicates the service BS. On the other hand, if a BS indicator is '0', it indicates the second target BS. Thus, it is possible to reduce an overhead of the detailed information field by using the reference carrier indicator.

Hereinafter, a configuration of the handover command message based on the number of active carriers in the terminal and a value of a pre-assignment requirement indicator included in the handover request message will be described by giving an example.

1. Primary Carrier is Only Activated for the Terminal (1) If the terminal transmits the handover request message with a pre-assignment requirement indicator set to '1', the service BS may transmit the handover command message with a pre-assignment response indicator set to '1'.

In this case, the service BS may activate one or more carriers at the service BS among the plurality of carriers assigned to the terminal at target BS in advance on the basis of the pre-assigned carrier information. Thus, the terminal has a plurality of active carriers. Then, the terminal may perform the handover through the plurality of active carriers, which will be described below by giving an example.

The terminal transmits the handover request message with a pre-assignment requirement indicator set to '1'.

The service BS may inform the terminal of whether the plurality of carriers assigned to the terminal in advance is active or not. The service BS may transmit the handover command message including the pre-assignment response indicator set to '1', the information about the pre-assigned carrier and the carrier activation information. Also, the service BS may additionally include information about a carrier to be activated for the handover. The activation information (hereinafter, referred to as 'additional activation information') about the assigned carrier for the handover at the service BS may be an index, an ranging indicator, etc. The additional activation information is different from the carrier activation information.

The terminal ascertains a carrier to be newly activated or inactivated during the handover or after the handover on the basis of the carrier activation information. The terminal may use the carrier, which is newly activated in the service BS for the handover, in communication with the service BS or a network reentry into the target BS, or may use it in the target BS after the handover.

The additional activation information may be provided using the pre-assigned carrier information and the carrier activation information. In other words, if the carrier that has already been assigned to the terminal but is not active in the service BS appears as it is assigned in advance and active in the target BS, it may be regarded that the corresponding carrier is activated in the service BS. If there is a carrier of the target BS corresponding to the newly activated carrier, the terminal may use the carrier newly activated in the service BS in network reentry. On the other hand, if there is no carrier of the target BS corresponding to the carrier newly activated in the service BS, the terminal may use the newly activated carrier in communication with the service BS.

In the case where the handover is initiated by the service BS without receiving the handover request message from the terminal, the same message and parameter are employed even if the handover command message has a pre-assignment requirement indicator set to '1' and the current terminal activates only a primary carrier. Also, if the target BS to which the terminal performs a handover can use a plurality of carriers, the service BS may previously transmit assignment information about the plurality of carriers, which will be used in the target BS in accordance with negotiation between the service BS and the target BS, to the terminal through the handover command message.

(2) If the terminal transmits the handover request message with a pre-assignment requirement indicator of '0', the service BS may transmit the handover command message with a pre-assignment response indicator of '0'.

2. A Plurality of Carriers are Activated for the Terminal (1) If the terminal transmits the handover request message with a pre-assignment requirement indicator set to '1', the service BS may transmit the handover command message with a pre-assignment response indicator set to '1'. The handover command message may further include the pre-assigned carrier information and the carrier activation information, Further, the handover command message includes the additional activation information to thereby notifying change in an activation state of the active carriers in the service BS. That is, the handover command message may contain information about the carriers to be inactivated among the active carriers in the service BS or information about the carriers to be additionally activated in the service BS.

The carrier activation information is a bitmap, and each bit corresponds to a carrier of a certain index and shows whether the carrier of the corresponding index is activated or inactivated. For example, if a certain bit is '1', it indicates that the carrier of the corresponding index becomes activated, and if a certain bit is '0', it indicates that the carrier of the corresponding index becomes inactivated.

(2) If the terminal transmits the handover request message with a pre-assignment requirement indicator set to '0', the service BS may transmit the handover command message with a pre-assignment response indicator set to '0'.

In this case, the service BS may inactivate the other carriers except one carrier among the plurality of active carriers. The one carrier may be the primary carrier. On the other hand, if the one carrier is not the primary carrier, this carrier is designated as a new primary carrier. Thus, the terminal uses the one carrier to perform a single-carrier handover.

Figure 3:
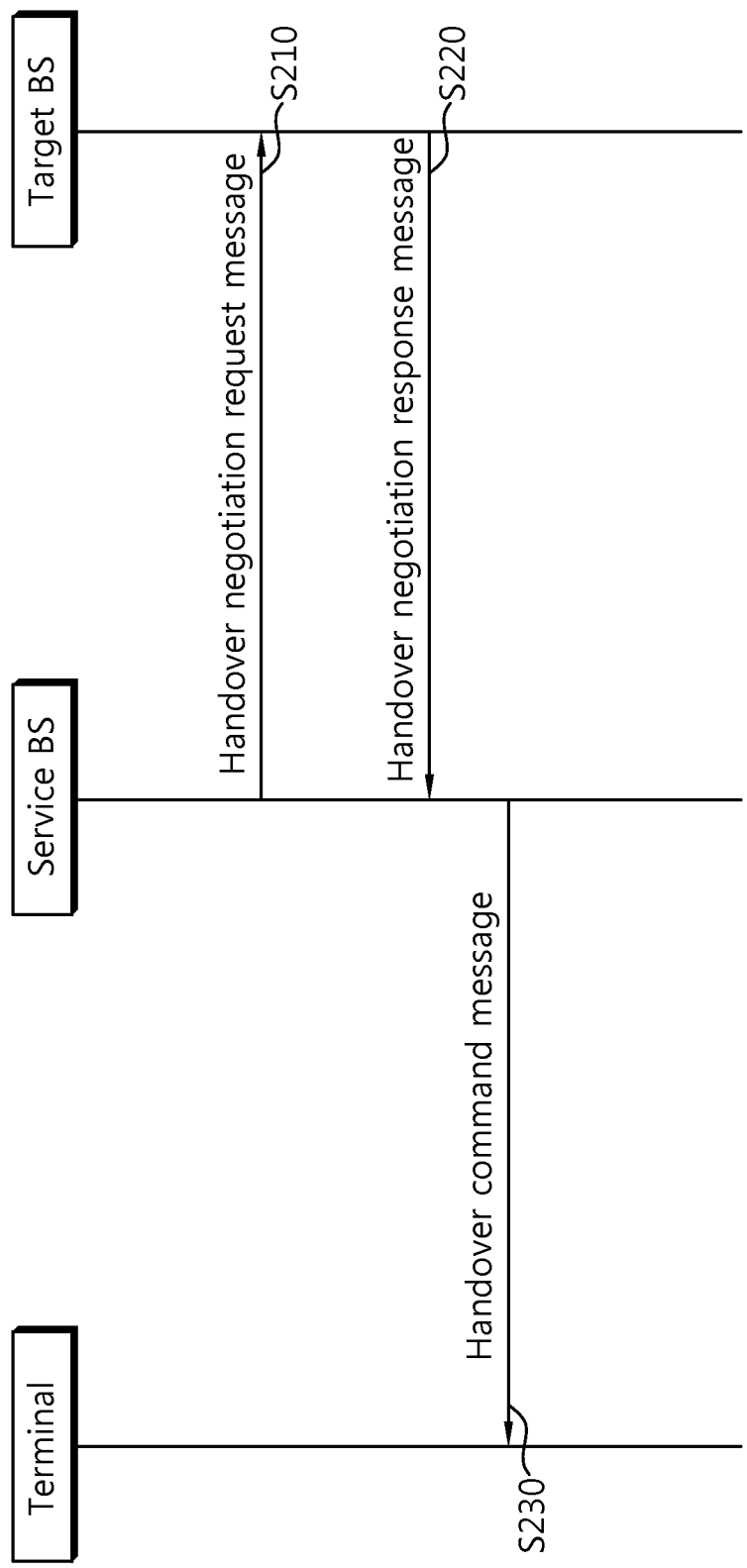
FIG. 3 is a flowchart showing another example of a handover method.

FIG. 3 is a flowchart showing another example of a handover method.

Referring to FIG. 3, the service BS transmits the handover negotiation request message to the target BS (S210). The target BS transmits the handover negotiation response message (S220). After the negotiation between the service BS and the target BS, the service BS transmits the handover command message to the terminal (S230). This is the handover method initiated by the service BS. The description referring to FIG. 2 may also be directly applied even when the handover method is initiated by the BS. The handover command message includes the pre-assignment response indicator. If the pre-assignment response indicator is '1', information about the carriers to be used in the target BS is added. The handover command message described with reference to FIG. 2 may be applied even when the terminal has one active carrier, i.e., the primary carrier.

Thus, it is possible to provide the handover method efficient in the wireless communication system. Information needed for performing the handover without any disconnection in data communication with the service BS may be added to the handover-related messages. The handover-related messages may include information about a scanning operation with regard to the target BS and the carriers during the handover and information about carriers which actually perform a network reentry into the target BS. Through this, the multi-carrier system performs the handover through the multi-carriers, so that the handover can be performed without any disconnection in the data communication with the service BS as opposed to the single-carrier handover.

Further, information or the like about the carriers to be used in the target BS may be additionally provided. With this, the terminal can acquire information about the multi-carriers at the target BS. In other words, information about the multi-carriers of the target BS can be exchanged during the handover. Thus, the total system performance can be improved.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of a handover from a service base station (BS) to a target BS by a terminal in a wireless communication system, the method comprising:

transmitting a handover request message to the service BS; and receiving a handover command message from the service BS in response to the handover request message, wherein the handover request message includes a pre-assignment requirement indicator for indicating whether the terminal requires pre-assignment of a secondary carrier at the target BS during a handover, and wherein the handover command message includes carrier activation information for indicating a pre-assigned secondary carrier to be activated at the target BS after the handover, a reentry mode field for indicating whether the terminal keeps communication with the service BS while performing a network reentry into the target BS, and pre-assigned carrier information that consists of a physical index of the pre-assigned secondary carrier.

2. The method of claim 1, wherein the handover command message includes a pre-assignment response indicator for indicating whether the secondary carrier is pre-assigned to the terminal.

3. The method of claim 1, wherein the carrier activation information instructs the other carriers except a primary carrier of the service BS to become inactivated at the service BS, wherein the other carriers are active carriers at the service BS and pre-assigned to the terminal for operation at the target BS.

4. The method of claim 1, wherein the carrier activation information comprises information about the pre-assigned secondary carrier to be deactivated among the multi-carriers at the service BS.

5. The method of claim 1, wherein the carrier activation information is a bitmap to indicate an activated carrier among the secondary carriers at the target BS.

6. A method of controlling a handover of a terminal by a service base station (BS) in a wireless communication system, the method comprising receiving a handover request message from the terminal;

transmitting a handover command message to the terminal in response to the handover request message, wherein the handover request message includes a pre-assignment requirement indicator for indicating whether the terminal requires pre-assignment of a secondary carrier at a target BS during a handover, and wherein the handover command message includes carrier activation information for indicating a pre-assigned secondary carrier to be activated at the target BS after the handover, and a reentry mode field for indicating whether the terminal keeps communication with the service BS while performing a network reentry into the target BS, and pre-assigned carrier information that consists of a physical index of the pre-assigned secondary carrier.

7. The method of claim 1, wherein the handover command message further includes an identifier of the target BS and pre-assigned carrier information of the target BS.

8. The method of claim 6, wherein the handover command message further includes an identifier of the target BS and pre-assigned carrier information of the target BS.

* * * * *